US008307011B2

(12) United States Patent
Chiaramonte et al.

(10) Patent No.: US 8,307,011 B2
(45) Date of Patent: Nov. 6, 2012

(54) SYSTEM AND METHOD FOR DETERMINING OVERALL UTILIZATION (75) Inventors: Michael R. Chiaramonte, Nesconset, NY (US); Kouros H. Esfahany, Huntington, NY (US)

(73) Assignee: CA, Inc., Islandia, NY (US)

( * ) Notice: Subject to any disclaimer, the term of this patent is extended or adjusted under 35 U.S.C. 154(b) by 809 days.

(21) Appl. No.: 12/123,885

(22) Filed: May 20, 2008

(65) Prior Publication Data
US 2009/0292715 A1    Nov. 26, 2009

(51) Int. Cl.
*G06F 17/30* (2006.01)
(52) U.S. Cl. .................................................. 707/798
(58) Field of Classification Search ................. 707/798
See application file for complete search history.

(56) References Cited

U.S. PATENT DOCUMENTS

| | | | |
|---|---|---|---|
| 5,819,028 A * | 10/1998 | Manghirmalani et al. | 714/57 |
| 5,867,483 A * | 2/1999 | Ennis et al. | 370/252 |
| 5,903,757 A * | 5/1999 | Gretz et al. | 717/127 |
| 6,101,500 A * | 8/2000 | Lau | 707/696 |
| 6,216,169 B1 * | 4/2001 | Booman et al. | 709/246 |
| 6,470,464 B2 * | 10/2002 | Bertram et al. | 714/37 |
| 6,675,128 B1 * | 1/2004 | Hellerstein | 702/186 |
| 6,704,284 B1 * | 3/2004 | Stevenson et al. | 370/241 |
| 6,738,933 B2 * | 5/2004 | Fraenkel et al. | 714/47.2 |
| 6,810,367 B2 * | 10/2004 | Barnard | 702/193 |
| 6,898,556 B2 * | 5/2005 | Smocha et al. | 702/186 |
| 6,975,963 B2 * | 12/2005 | Hamilton et al. | 702/186 |
| 7,003,564 B2 * | 2/2006 | Greuel et al. | 709/224 |
| 7,340,598 B2 | 3/2008 | Esfahany | 713/100 |
| 7,870,014 B2 * | 1/2011 | Baughn et al. | 705/7.14 |
| 2002/0039352 A1 * | 4/2002 | El-Fekih et al. | 370/252 |
| 2002/0152301 A1 * | 10/2002 | Garrett et al. | 709/224 |
| 2003/0126254 A1 * | 7/2003 | Cruickshank et al. | 709/224 |
| 2003/0204789 A1 * | 10/2003 | Peebles et al. | 714/47 |
| 2004/0215622 A1 * | 10/2004 | Dubnicki et al. | 707/10 |
| 2005/0065753 A1 * | 3/2005 | Bigus et al. | 702/186 |
| 2006/0047809 A1 * | 3/2006 | Slattery et al. | 709/224 |
| 2006/0241907 A1 * | 10/2006 | Armstrong et al. | 702/182 |
| 2006/0277206 A1 * | 12/2006 | Bailey et al. | 707/102 |
| 2007/0073709 A1 * | 3/2007 | Lim et al. | 707/10 |
| 2007/0233866 A1 * | 10/2007 | Appleby et al. | 709/226 |
| 2007/0250829 A1 * | 10/2007 | Hillier et al. | 717/170 |
| 2009/0138239 A1 * | 5/2009 | Golani et al. | 702/186 |

OTHER PUBLICATIONS

Applebyet al., "Using Automatically Derived Load Thresholds to Manage Compute Resources On-Demand," 2005, IEEE, 9th IFI/IEEE Symposium on Integrated Management (IM2005), pp. 747-760.*

Boardman, "Network Management That Works," Feb. 7, 2000, Network Computing for IT by IT, http://www.networkcomputing.com/1102/1102f1.html, accessed Dec. 21, 2011.*

(Continued)

*Primary Examiner* — Fred I Ehichioya
*Assistant Examiner* — Richard Bowen
(74) *Attorney, Agent, or Firm* — Baker Botts L.L.P.

(57) ABSTRACT

The present disclosure is directed to a method and system for determining overall utilization. In accordance with a particular embodiment of the present disclosure, utilization metrics are received from at least one entity. Each utilization metric indicates resource availability for the entity. The utilization metrics are converted to mapped values by comparing the utilization metrics to configured thresholds. The mapped values are converted to percentage values. An overall utilization is calculated for the entity by identifying an average value of the percentage values. A graphical representation of the overall utilization is generated.

23 Claims, 4 Drawing Sheets

OTHER PUBLICATIONS

J. Moore, J. Chase, K. Farkas, and P. Ranganathan. Data center workload monitoring, analysis, and emulation. In Eighth Workshop on Computer Architecture Evaluation using Commercial Workloads, Feb. 2005.*

U.S. Appl. No. 12/203,018; Inventors: Esfahany et al.; Title: System and Method for Dynamic Resource Provisioning for Job Placement, filed Sep. 2, 2008.

* cited by examiner

SYSTEM AND METHOD FOR DETERMINING OVERALL UTILIZATION

TECHNICAL FIELD

The present disclosure relates generally to utilization, and more particularly to a system and method for determining overall utilization.

BACKGROUND

Data collection has become increasingly more important, particularly to identify performance issues for certain entities such as servers, devices, and information technology (IT) services. For example, a user may analyze different utilization metrics for a server. However, this approach is problematic because analyzing these metrics may be time consuming for the user. In addition, different users may interpret the metrics differently.

SUMMARY

In accordance with the present invention, the disadvantages and problems associated with previous techniques may be reduced or eliminated.

In accordance with a particular embodiment of the present disclosure, a method includes receiving utilization metrics from at least one entity. Each utilization metric indicates resource availability for the entity. The method also includes converting the utilization metrics to mapped values by comparing the utilization metrics to configured thresholds. The method further includes converting the mapped values to percentage values. The method further includes calculating an overall utilization for the entity by identifying an average value of the percentage values. The method further includes generating a graphical representation of the overall utilization.

Technical advantages of particular embodiments of the present disclosure include a system and method for determining overall utilization where a user may establish configured thresholds according to priority. For example, an entity may have a limited number of memory resources. A configured threshold may be established for the entity to reflect a high priority for memory resources. As another example, the configured thresholds may be automatically established using baselines.

Further technical advantages of particular embodiments of the present disclosure include a system and method for determining overall utilization that includes a graphical representation of the overall utilization of an entity. For example, the graphical representation may include a unified display of utilization metrics along with overall utilization. Therefore, a user may understand the overall utilization for the entity based utilization metrics.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

For many entities such as servers, devices, and information technology (IT) services, determining the overall utilization is a difficult task. While an entity may have one or more predetermined performance metrics, it is difficult to combine these metrics into one overall utilization that describes the current usage state of the entity. Some solutions combine metrics into an average value. However, these solutions produce incorrect results when the units of measurement for the metrics are not the same.

In accordance with the teachings of the present disclosure, overall utilization is determined based on configured thresholds that provide a meaningful representation of the utilization of an entity. The configured thresholds may be predefined, automatically established, or user established, as examples.

The overall utilization may be provided in the form of a graphical representation that allows a user to review performance of an entity. The graphical representation may include several components to customize the display of the graphical representation. Additional details of example embodiments of the present disclosure are described in detail below.

Figure 1:
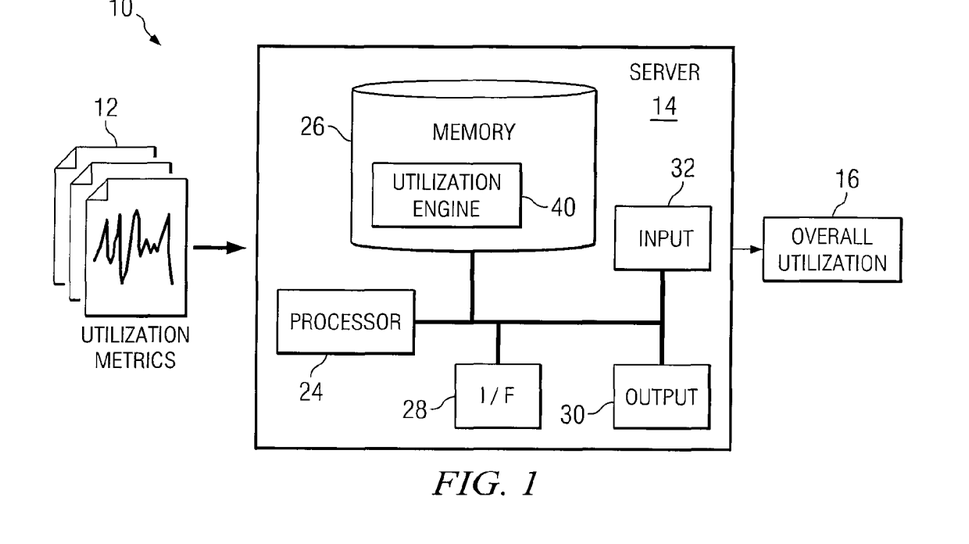
FIG. 1 is a block diagram illustrating a system for determining overall utilization, according to the teachings of the present disclosure.

FIG. 1 is a block diagram illustrating a system 10 for determining overall utilization. System 10 generally includes one or more utilization metrics 12, a server 14, a utilization engine 40, and overall utilization 16. In particular embodiments, utilization engine 40 may receive utilization metrics 12 from an entity and utilization engine 40 may determine overall utilization 16 for the entity.

Utilization metrics 12 may refer to any suitable data received and stored at server 14. In particular embodiments, utilization metrics 12 may include data for an entity, such as a server. In particular embodiments, utilization metrics may indicate resource availability for the entity. For example, utilization metrics 12 may include memory utilization metrics, such as paging metrics, swapping metrics, and available memory metrics at a particular server. As another example, utilization metrics 12 may include CPU utilization metrics at the particular server.

Server 14 may refer to any suitable device operable to execute utilization engine 40. Examples of server 14 may include a host computer, workstation, web server, file server, a personal computer such as a laptop, or any other suitable device. Server 14 may include any operating system such as MS-DOS, PC-DOS, MAC-OS, WINDOWS, UNIX, or other appropriate operating systems, including future operating systems.

Utilization engine 40 may include any suitable logic and/or hardware that receives utilization metrics 12 and determines overall utilization 16 for an entity. In particular embodiments, utilization engine 40 may determine overall utilization 16 based on configured thresholds. For example, the utilization metrics may be converted to mapped values by comparing the utilization metrics to configured thresholds. In particular embodiments, each of the mapped values may include a number from zero to three. The purpose of this mapping is to reflect the utilization of the metric. By mapping other metrics accordingly, all metrics may contribute equally to overall utilization 16.

In particular embodiments, the configured thresholds may be established according to a scale from the number zero to the number three. For example, the range from the number zero to the number one may represent under-utilization, and a lower threshold may represent the number one. The range from the number one to the number two may represent under-utilization to normal utilization, and a midpoint threshold may represent the number two. The range from the number two to the number three may represent normal to over-utilization, and an upper threshold may represent the number three. The range above the number three represents over-utilization.

In particular embodiments, utilization engine 40 may convert the utilization metrics to mapped values by comparing the utilization metrics to the configured thresholds. For example, if the utilization metric is greater than or equal to the number zero and less than or equal to the lower threshold, then the following formula may be applied to identify the mapped value: (the value of the metric)/(the lower threshold).

As another example, if the utilization metric is greater than the lower threshold and less than or equal to the midpoint threshold, then the following formula may be applied to identify the mapped value: ((the value of the metric−the lower threshold)/(the midpoint threshold−the lower threshold))+1.

As another example, if the utilization metric is greater than the midpoint threshold and less than or equal to the upper threshold, then the following formula may be applied to identify the mapped value: ((the value of the metric−the midpoint threshold)/(the upper threshold−the midpoint threshold))+2. If the utilization metric does not fall into any of the categories described above, the mapped value may equal the number three.

In particular embodiments, utilization engine 40 may convert the mapped values to percentage values. For example, a mapped value of 2.39 for memory utilization may be converted by dividing the number 2.39 by the number three, resulting in a percentage value of 80% for memory utilization. As another example, a mapped value of 1.1 for CPU utilization may be converted by dividing the number 1.1 by the number three, resulting in a percentage value of 37% for CPU utilization.

In particular embodiments, utilization engine 40 may calculate overall utilization 16 for the entity by identifying an average value of the percentage values. For example, if the percentage values are 80% for memory utilization and 37% for CPU utilization, the average value may be 58.5% based on the following calculation: (80+37)/2. Therefore, overall utilization 16 for the entity may be 58.5%.

In particular embodiments, the mapping described above may be applied to metrics that represent a quantity of a resource that is still available, also referred to as availability metrics. For availability metrics, more availability is generally better. Therefore, the mapping described above may be reversed to reflect availability and a capped best value. Further details of particular embodiments of the present invention are provided with reference to FIGS. 2-5. Additional details of the other components of server 14 are described below.

Processor 24 may refer to any suitable device operable to execute instructions and manipulate data to perform operations for server 14. Processor 24 may include, for example, any type of central processing unit (CPU).

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface (I/F) 28 may refer to any suitable device operable to receive input, send output, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows server 14 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Input device 32 may refer to any suitable device operable to input, select, and/or manipulate various data and information. Input device 32 may include, for example, a keyboard, mouse, graphics tablet, joystick, light pen, microphone, scanner, or other suitable input device. Additional details of example embodiments of the disclosure are described in greater detail below in conjunction with portions of FIG. 2 and FIG. 3.

Figure 2:
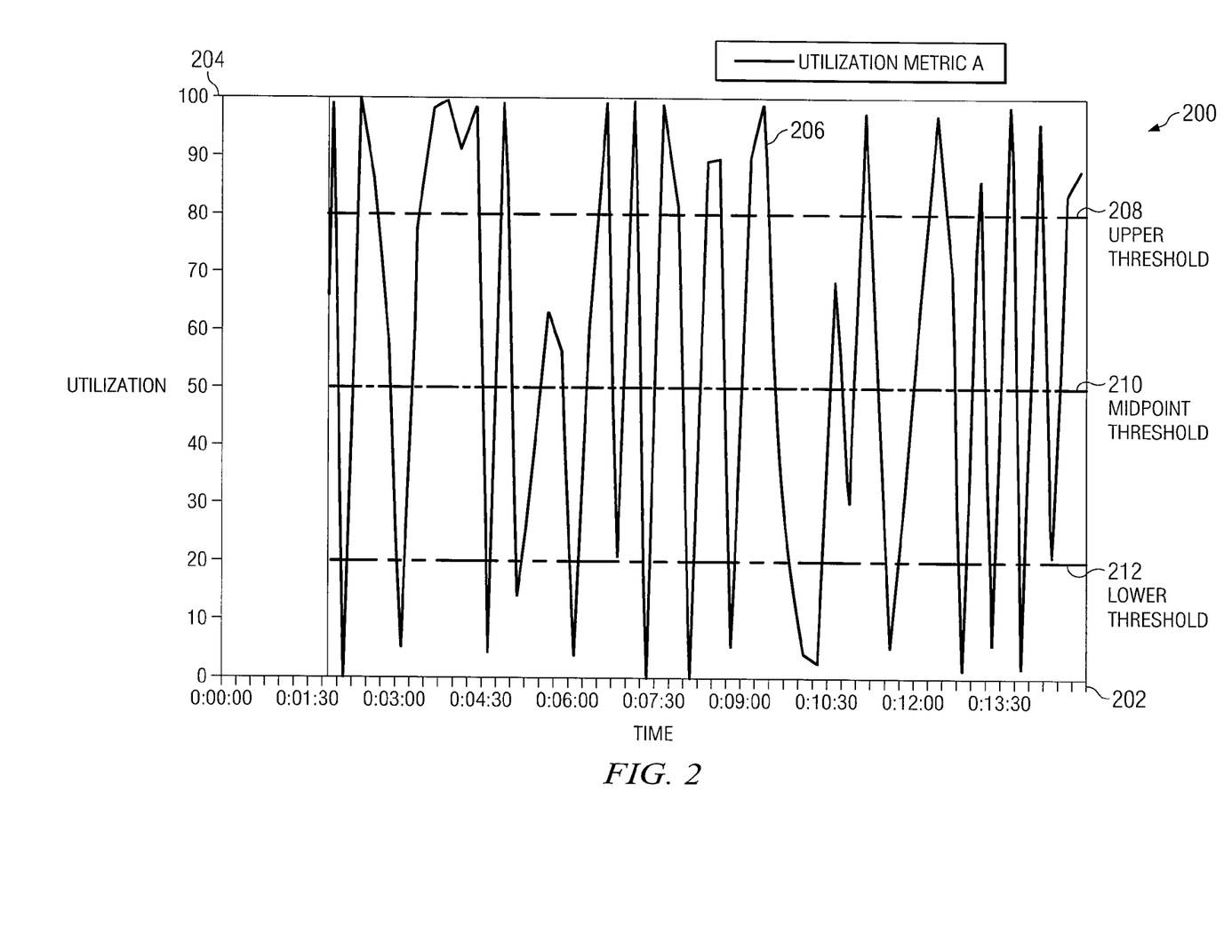
FIG. 2 is a diagram illustrating one embodiment of configured thresholds including an upper threshold, a midpoint threshold, and a lower threshold, according to the teachings of the present disclosure.

FIG. 2 is a diagram 200 illustrating one embodiment of configured thresholds including an upper threshold 208, a midpoint threshold 210, and a lower threshold 212, according to the teachings of the present disclosure. As shown in the illustrated embodiment, utilization metric A is displayed across time 202 and utilization 204.

In particular embodiments, the range from a utilization value of 0 to a utilization value of 20 may be considered under-utilized. The range from a utilization value of 20 to a utilization value of 50 may be considered a normal utilization but closer to under-utilized. The range from a utilization value of 50 to a utilization value of 80 may be considered a normal utilization but closer to over-utilized. The range from a utilization value of 80 to a utilization value of 100 may be considered over-utilized. Therefore, upper threshold 208 is established at a utilization value of 80, midpoint threshold 210 is established at a utilization value of 50, and lower threshold 212 is established at a utilization value of 20.

In particular embodiments, if utilization metric A is greater than upper threshold 208 (as indicated by reference number 206), utilization metric A may be converted to a mapped value of three.

In particular embodiments, if utilization metric A at another particular period of time is 60, then utilization metric A is greater than midpoint threshold 210 and less than upper threshold 208, and the following formula may be applied to identify the mapped value: ((the value of the metric−the midpoint threshold)/(the upper threshold−the midpoint threshold))+2. Therefore, utilization metric A may be converted to a mapped value of 2.33 as a result of the following calculation: ((60−50)/(80−50))+2.

Figure 3:
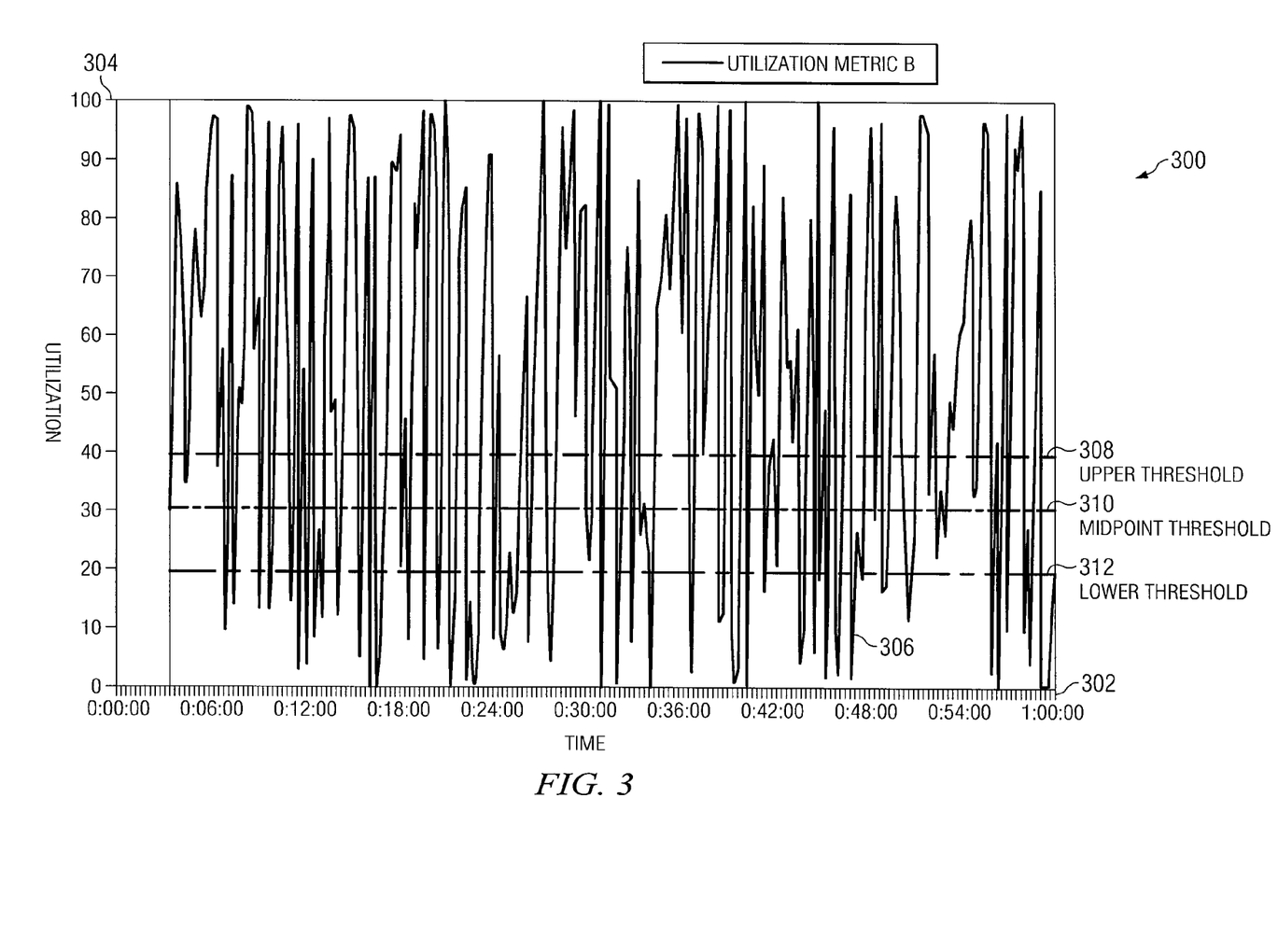
FIG. 3 is a diagram illustrating another embodiment of configured thresholds including an upper threshold, a midpoint threshold, and a lower threshold, according to the teachings of the present disclosure.

FIG. 3 is a diagram 300 illustrating another embodiment of configured thresholds including an upper threshold 308, a midpoint threshold 310, and a lower threshold 312, according to the teachings of the present disclosure. As shown in the illustrated embodiment, utilization metric B is displayed across time 302 and utilization 304.

In particular embodiments, the range from a utilization value of 0 to a utilization value of 20 may be considered under-utilized. The range from a utilization value of 20 to a utilization value of 30 may be considered a normal utilization but closer to under-utilized. The range from a utilization value of 30 to a utilization value of 40 may be considered a normal utilization but closer to over-utilized. The range from a utilization value of 40 to a utilization value of 100 may be considered over-utilized. Therefore, upper threshold 308 is established at a utilization value of 40, midpoint threshold 310 is established at a utilization value of 30, and lower threshold 312 is established at a utilization value of 20.

In particular embodiments, if utilization metric B is 10 (less than lower threshold 312, as indicated by reference number 306), then the following formula may be applied to identify the mapped value: (the value of the metric)/(the lower threshold). Therefore, utilization metric B may be converted to a mapped value of 0.5 as a result of the following calculation: (10/20).

In particular embodiments, if utilization metric B at another particular period of time is 25, then utilization metric A is greater than lower threshold 312 and less than midpoint threshold 310, and the following formula may be applied to identify the mapped value: ((the value of the metric−the lower threshold)/(the midpoint threshold−the lower threshold))+1. Therefore, utilization metric B may be converted to a mapped value of 1.5 as a result of the following calculation: ((25−20)/(30−20))+1.

Figure 4:
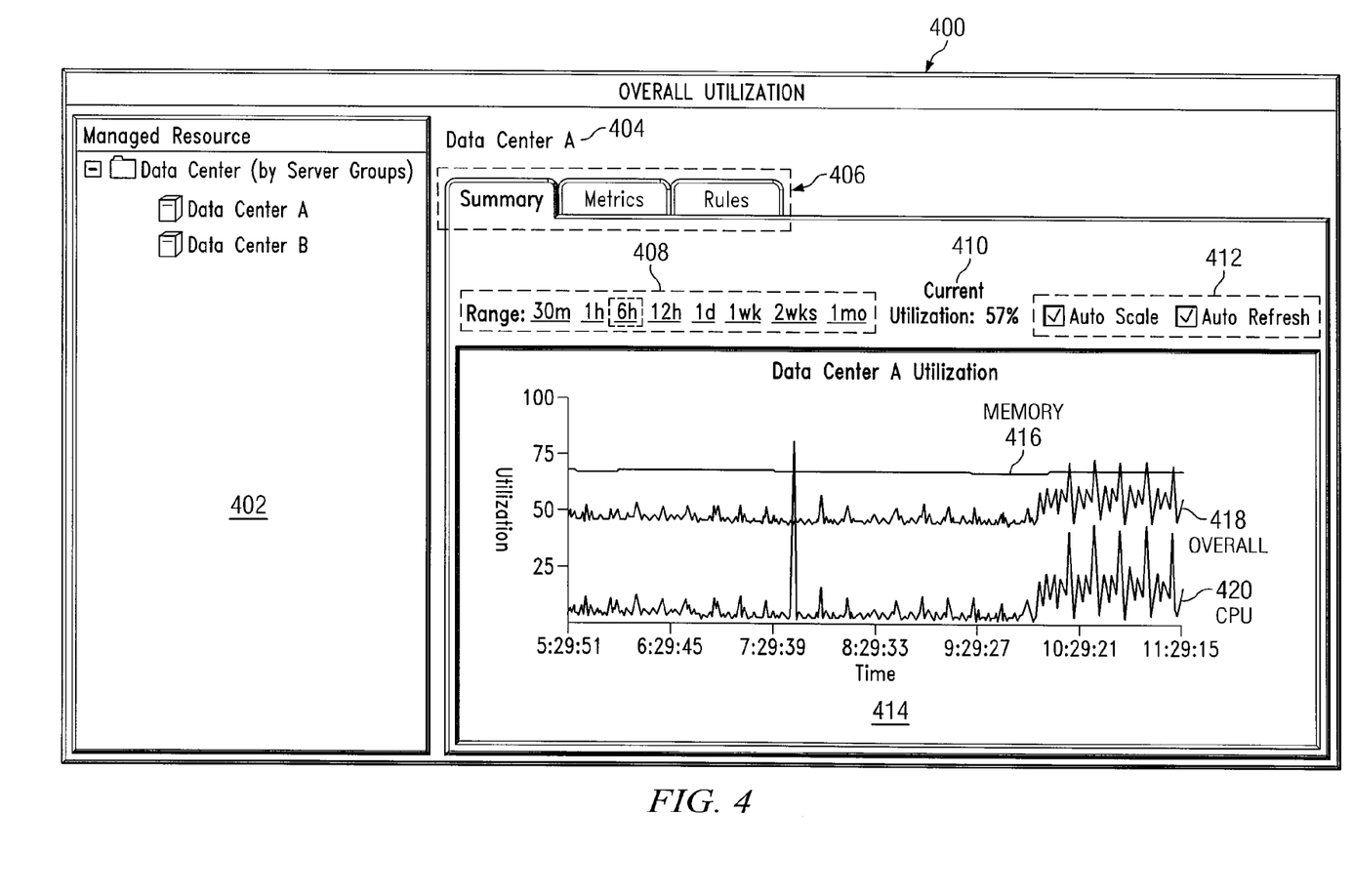
FIG. 4 is a diagram illustrating one embodiment of a graphical representation of overall utilization, according to the teachings of the present disclosure.

FIG. 4 is a diagram illustrating one embodiment of a graphical representation 400 of overall utilization, according to the teachings of the present disclosure. In particular embodiments, graphical representation 400 may be presented in any suitable display, such as a browser. Graphical representation 400 includes a utilization display 414 that includes memory utilization 416, CPU utilization 420, and overall utilization 418. Graphical representation 400 also includes several components to customize the display of graphical representation 400 including a menu 402, title bar 404, tab display 406, range criteria 408, current utilization 410, and display criteria 412.

As described above, the overall utilization displayed by graphical representation 400 may be customized according to one or more buttons and selection boxes in menu 402, title bar 404, tab display 406, range criteria 408, current utilization 410, and display criteria 412. For example, a particular entity, such as Data Center A and Data Center B may be selected for presentation. In the illustrated embodiment, Data Center A is selected for presentation in utilization display 414, as indicated by title bar 404. As another example, tab display 406 may include several tabs to customize graphical representation 400 including a tab to display a summary of the overall utilization, a tab to display one or more utilization metrics, and a tab to display one or more rules.

As another example, graphical representation 400 may be customized by range criteria 408 and display criteria 412. In the example, range criteria 408 may include selection boxes to select a view based on a particular period of time, such as 30 minutes, one hour, six hours, 12 hours, one day, one week, two weeks, and one month, as examples. In the example, display criteria 412 may include selection boxes to select an auto scale feature to scale the data in utilization display 414 and an auto refresh feature to refresh the data in utilization display 414. In the illustrated embodiment, a six hour view is selected and the selection boxes for auto scale and auto refresh are both selected.

As shown in the illustrated embodiment, overall utilization 418 has a current utilization 410 percentage value of 57%. As described above, overall utilization 418 may be calculated based on metrics for memory utilization 416 and CPU utilization 420, as examples. Memory utilization 416 and CPU utilization 420 may be converted to mapped values based on one or more thresholds. In particular embodiments, the mapped values for memory utilization 416 and CPU utilization 420 may be converted to percentage values. For example, a mapped value of 1.1 for CPU utilization 420 may be converted by dividing the number 1.1 by the number three, resulting in a percentage value of 37%. According to one embodiment, percentage values for the metrics, such as memory utilization 416 and CPU utilization 420, may be averaged and the result may be overall utilization 418 and represented by current utilization 410.

Figure 5:
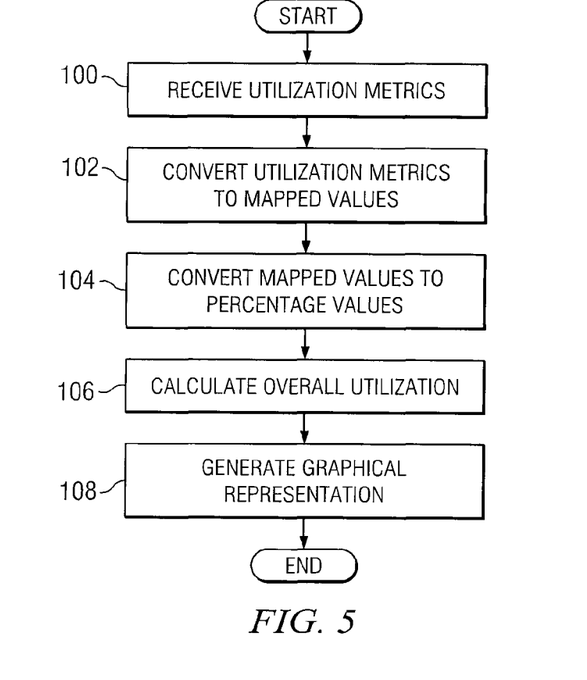
FIG. 5 is a flow diagram illustrating a method for determining overall utilization, according to the teachings of the present disclosure.

FIG. 5 is a flow diagram illustrating a method for determining overall utilization, according to the teachings of the present disclosure. The method begins at step 100 where utilization metrics are received from at least one entity. For example, each utilization metric may indicate resource availability for the entity.

At step 102, the utilization metrics are converted to a plurality of mapped values by comparing the utilization metrics to configured thresholds. For example, the configured thresholds may include an upper threshold, a midpoint threshold, and a lower threshold.

At step 104, the mapped values are converted to percentage values. For example, a mapped value of 2.39 for memory utilization may be converted by dividing the number 2.39 by the number three, resulting in a percentage value of 80% for memory utilization. As another example, a mapped value of 1.1 for CPU utilization may be converted by dividing the number 1.1 by the number three, resulting in a percentage value of 37% for CPU utilization.

At step 106, an overall utilization is calculated for the entity by identifying an average value of the percentage values. For example, if the percentage values are 80% for memory utilization and 37% for CPU utilization, the average value may be 58.5% based on the following calculation: (80+37)/2. Therefore, the overall utilization for the entity may be 58.5%. At step 108, a graphical representation of the overall utilization is generated. Thus, an overall utilization based on configured thresholds is calculated that provides a meaningful view of the utilization of an entity without requiring all the utilization metrics to be the same unit of measure.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method, comprising:
  receiving a plurality of utilization metrics from at least one entity, each utilization metric indicating resource availability for the at least one entity;
  comparing each of the plurality of utilization metrics to a plurality of configured thresholds, wherein the plurality of thresholds comprises at least a first threshold and a second threshold;

identifying a relative position of each utilization metric with respect to the plurality of configured thresholds for each of the utilization metrics;

converting each of the plurality of utilization metrics to a mapped value based on the identified relative position of the utilization metric;

wherein when the utilization metric is less than each configured threshold, the conversion of the utilization metric to a mapped value is based on the utilization metric and the lowest threshold of the configured thresholds;

wherein when the utilization metric is between the first threshold and the second threshold, the conversion of the utilization metric to a mapped value is based on the utilization metric, the first threshold, and the second threshold;

wherein when the utilization metric is greater than each configured threshold, the conversion of the utilization metric to a mapped value is based on the utilization metric and the greatest threshold of the configured thresholds;

converting the plurality of mapped values to a plurality of percentage values;

calculating an overall utilization for the at least one entity by identifying an average value of the plurality of percentage values; and generating a graphical representation of the overall utilization.

2. The method of claim 1, wherein the plurality of configured thresholds further comprises a third threshold, wherein the first threshold is below the second threshold, and the second threshold is below the third threshold.

3. The method of claim 2, wherein each of the plurality of mapped values comprises a number from zero to three.

4. The method of claim 2, wherein converting the plurality of mapped values to a plurality of percentage values comprises dividing each of the plurality of mapped values by three.

5. The method of claim 2, wherein when the utilization metric is between the second threshold and the third threshold, the conversion of the utilization metric to a mapped value is based on the utilization metric, the second threshold, and the third threshold.

6. The method of claim 1, wherein the first and second thresholds define under-utilization and over-utilization thresholds.

7. The method of claim 1, wherein the overall utilization comprises a percentage.

8. The method of claim 1, wherein the number of the plurality of configured thresholds is two and each of the plurality of mapped values comprises a number from zero to two.

9. A system, comprising:
a storage device; and
a processor, the processor operable to execute a program of instructions operable to:
receive a plurality of utilization metrics from at least one entity, each utilization metric indicating resource availability for the at least one entity;
compare each of the plurality of utilization metrics to a plurality of configured thresholds, wherein the plurality of thresholds comprises at least a first threshold and a second threshold;
identify a relative position of each utilization metric with respect to the plurality of configured thresholds for each of the utilization metrics;
convert each of the plurality of utilization metrics to a mapped value based on the identified relative position of the utilization metric;
wherein when the utilization metric is less than each configured threshold, the conversion of the utilization metric to a mapped value is based on the utilization metric and the lowest threshold of the configured thresholds;
wherein when the utilization metric is between the first threshold and the second threshold, the conversion of the utilization metric to a mapped value is based on the utilization metric, the first threshold, and the second threshold;
wherein when the utilization metric is greater than each configured threshold, the conversion of the utilization metric to a mapped value is based on the utilization metric and the greatest threshold of the configured thresholds;
convert the plurality of mapped values to a plurality of percentage values;
calculate an overall utilization for the at least one entity by identifying an average value of the plurality of percentage values; and
generate a graphical representation of the overall utilization.

10. The system of claim 9, wherein the plurality of configured thresholds further comprises a third threshold, wherein the first threshold is below the second threshold, and the second threshold is below the third threshold.

11. The system of claim 10, wherein each of the plurality of mapped values comprises a number from zero to three.

12. The system of claim 10, wherein the program of instructions is further operable to divide each of the plurality of mapped values by three.

13. The system of claim 10, wherein when the utilization metric is between the second threshold and the third threshold, the conversion of the utilization metric to a mapped value is based on the utilization metric, the second threshold, and the third threshold.

14. The system of claim 9, wherein the plurality of configured thresholds define under-utilization and over-utilization thresholds.

15. The system of claim 9, wherein the overall utilization comprises a percentage.

16. The system of claim 9, wherein the number of the plurality of configured thresholds is two and each of the plurality of mapped values comprises a number from zero to two.

17. A non-transitory computer readable medium comprising logic, the logic being operable, when executed on a processor, to:
receive a plurality of utilization metrics from at least one entity, each utilization metric indicating resource availability for the at least one entity;
compare each of the plurality of utilization metrics to a plurality of configured thresholds, wherein the plurality of configured thresholds comprises at least a first threshold and a second threshold;
identify a relative position of each utilization metric with respect to the plurality of configured thresholds for each of the utilization metrics;
convert each of the plurality of utilization metrics to a mapped value based on the identified relative position of the utilization metric;
wherein when the utilization metric is less than each configured threshold, the conversion of the utilization metric to a mapped value is based on the utilization metric and the lowest threshold of the configured thresholds;

wherein when the utilization metric is between the first threshold and the second threshold, the conversion of the utilization metric to a mapped value is based on the utilization metric, the first threshold, and the second threshold;

wherein when the utilization metric is greater than each configured threshold, the conversion of the utilization metric to a mapped value is based on the utilization metric and the greatest threshold of the configured thresholds;

convert the plurality of mapped values to a plurality of percentage values;

calculate an overall utilization for the at least one entity by identifying an average value of the plurality of percentage values; and generate a graphical representation of the overall utilization.

18. The non-transitory computer readable medium of claim 17, wherein the plurality of configured thresholds further comprises a third threshold, wherein the first threshold is below the second threshold, and the second threshold is below the third threshold.

19. The non-transitory computer readable medium of claim 18, wherein each of the plurality of mapped values comprises a number from zero to three.

20. The non-transitory computer readable medium of claim 18, wherein when the utilization metric is between the second threshold and the third threshold, the conversion of the utilization metric to a mapped value is based on the utilization metric, the second threshold, and the third threshold.

21. The non-transitory computer readable medium of claim 17, wherein the plurality of configured thresholds define under-utilization and over-utilization thresholds.

22. The non-transitory computer readable medium of claim 17, wherein the overall utilization comprises a percentage.

23. The non-transitory computer readable medium of claim 17, wherein the number of the plurality of configured thresholds is two and each of the plurality of mapped values comprises a number from zero to two.

* * * * *